(12) United States Patent
Luu et al.

(10) Patent No.: US 11,953,932 B2
(45) Date of Patent: Apr. 9, 2024

(54) PEDAL ASSEMBLY HAVING FORCE SENSING

(71) Applicant: KSR IP Holdings, LLC, Wilmington, DE (US)

(72) Inventors: Rachel Luu, Chatham (CA); Lingmin Shao, London (CA)

(73) Assignee: KSR IP Holdings, LLC, Wilmington, DE (US)

( * ) Notice: Subject to any disclaimer, the term of this patent is extended or adjusted under 35 U.S.C. 154(b) by 0 days.

(21) Appl. No.: 18/107,775

(22) Filed: Feb. 9, 2023

(65) Prior Publication Data
US 2023/0259152 A1 Aug. 17, 2023

Related U.S. Application Data

(60) Provisional application No. 63/309,817, filed on Feb. 14, 2022.

(51) Int. Cl.
| | |
|---|---|
| *G05G 1/38* | (2008.04) |
| *G01D 5/14* | (2006.01) |
| *G01L 1/18* | (2006.01) |
| *G01L 5/22* | (2006.01) |
| *G05G 1/42* | (2008.04) |
| *G01L 1/22* | (2006.01) |
| *G05G 1/44* | (2008.04) |

(Continued)

(52) U.S. Cl.
CPC ................ *G05G 1/38* (2013.01); *G01D 5/14* (2013.01); *G01L 1/18* (2013.01); *G01L 5/225* (2013.01); *G05G 1/42* (2013.01); *G01L 1/2206* (2013.01); *G05G 1/44* (2013.01); *G05G 1/50* (2013.01); *G05G 5/05* (2013.01)

(58) Field of Classification Search
CPC ............ G01L 5/225; G05G 1/42; G05G 1/50
See application file for complete search history.

(56) References Cited

U.S. PATENT DOCUMENTS

| | | | |
|---|---|---|---|
| 7,086,297 B2 | 8/2006 | Blakesley et al. | |
| 7,134,327 B2* | 11/2006 | Saito | ........................ G01L 5/225 73/132 |
| 7,418,862 B2 | 9/2008 | Gruben et al. | |

(Continued)

FOREIGN PATENT DOCUMENTS

| | | |
|---|---|---|
| DE | 102016116619 A1 | 3/2018 |
| JP | 2008120348 A | 5/2008 |

(Continued)

*Primary Examiner* — Vicky A Johnson
(74) *Attorney, Agent, or Firm* — Dinsmore & Shohl LLP (57) ABSTRACT

Embodiments herein are directed to a pedal assembly. The pedal assembly includes a housing, a pedal arm, at least one elongated member, and at least one strain gauge sensor. The pedal arm has a pedal pad on one end. The at least one elongated member is positioned within a cavity and configured to deflect upon a movement by the pedal arm caused from a load applied to the pedal pad. The at least one strain gauge sensor is positioned in communication with the at least one elongated member and configured to sense an amount of the deflection of the at least one elongated member. When the load is applied to the pedal pad, the pedal arm moves and deflects the at least one elongated member, which is sensed by the respective at least one strain gauge sensor indicative of an amount of load applied to the pedal pad.

20 Claims, 6 Drawing Sheets

(51) Int. Cl.
*G05G 1/50* (2008.04)
*G05G 5/05* (2006.01)

(56) References Cited

U.S. PATENT DOCUMENTS

| | | |
|---|---|---|
| 9,134,748 B2 | 9/2015 | Fujiwara |
| 9,442,030 B2 | 9/2016 | Fujiwara et al. |
| 9,989,987 B2 * | 6/2018 | Fujiwara .................. G05G 1/38 |
| 10,175,712 B2 | 1/2019 | Kaijala |
| 10,860,048 B2 | 12/2020 | Kihara et al. |
| 2002/0056337 A1 * | 5/2002 | Sundaresan .............. G05G 1/30 |
| | | 74/513 |
| 2004/0040408 A1 | 3/2004 | Shaw et al. |
| 2007/0068218 A1 | 3/2007 | Pecher et al. |
| 2007/0296268 A1 | 12/2007 | Shaw et al. |
| 2010/0024590 A1 | 2/2010 | O'Neill et al. |
| 2013/0021087 A1 | 1/2013 | Rosset et al. |
| 2014/0311277 A1 | 10/2014 | Fujiwara |
| 2015/0206675 A1 | 7/2015 | Modi et al. |
| 2015/0377724 A1 | 12/2015 | Benkert et al. |
| 2018/0283967 A1 | 10/2018 | Kato |
| 2021/0381913 A1 | 12/2021 | Kitamura et al. |

FOREIGN PATENT DOCUMENTS

| | | |
|---|---|---|
| KR | 20140013468 A | 3/2014 |
| WO | 2005104001 A2 | 11/2005 |
| WO | 2020142804 A1 | 7/2020 |

* cited by examiner

PEDAL ASSEMBLY HAVING FORCE SENSING

CROSS-REFERENCE TO RELATED APPLICATIONS

This utility patent application claims priority benefit from U.S. Provisional Patent Application Ser. No. 63/309,817, filed Feb. 14, 2022, and entitled "Pedal Pad Force Sensors", the entire contents of which is incorporated herein in its entirety.

TECHNICAL FIELD

The present specification generally relates to pedal assemblies for vehicles and, more specifically, to force sensing pedal assemblies.

BACKGROUND

Conventional pedal assemblies include a pedal arm that is pivotally coupled to a housing at one end and a pedal pad positioned on an opposite end. In these pedal assemblies, various inductive or Hall Effect type sensors are positioned within the housing to measure the amount of pivot of the pedal arm with respect to the a target. When a force is applied to the pedal pad, the pedal arm pivots and, based on the amount of pivot, generally electric motors control the vehicle accordingly. However, in floor mounted pedal pads, a user may not apply the same pressure or load over the entire pedal pad. As such, load balancing and measuring small amount of travel of the pedal arm are issues.

SUMMARY

In one embodiment, a pedal assembly is provided. The pedal assembly includes a housing, a pedal arm, at least one elongated member, and at least one strain gauge sensor. The housing has a cavity. The pedal arm is at least partially received in the cavity. The pedal arm has a pedal pad on one end. The pedal arm is configured to move within the cavity relative to the housing. The at least one elongated member is positioned within the cavity and configured to deflect upon a movement by the pedal arm caused from a load applied to the pedal pad. The at least one strain gauge sensor is positioned in communication with the at least one elongated member and configured to sense an amount of the deflection of the at least one elongated member. When the load is applied to the pedal pad, the pedal arm moves and deflects the at least one elongated member, which is sensed by the respective at least one strain gauge sensor indicative of an amount of load applied to the pedal pad.

In another embodiment, a pedal assembly is provided. The pedal assembly includes a housing, a pedal arm, three elongated members, three strain gauge sensors, and a pair of circuit boards. The housing has a cavity. The pedal arm is at least partially received in the cavity. The pedal arm has a pedal pad on one end. The pedal arm is configured to move within the cavity relative to the housing. The three elongated members are positioned within the cavity and configured to deflect upon a movement by the pedal arm caused from a load applied to the pedal pad. Three strain gauge sensors are positioned in communication with a respective one of the three elongated members and configured to sense an amount of the deflection of the respective elongated member of the three elongated members. When the load is applied to the pedal pad, the pedal arm moves and deflects the at least one elongated member, which is sensed by the respective at least one strain gauge sensor indicative of an amount of load applied to the pedal pad. Two of the three strain gauge sensors communicatively coupled to the one of the pair of circuit boards and the other strain gauge sensor of the three strain gauge sensors communicatively coupled to the other one of the pair of circuit boards. When the load is applied to the pedal pad, the pedal arm moves to deflect at least one of the three elongated members which is sensed by the respective strain gauge sensor indicative of the amount of an amount of load applied to the pedal pad.

In yet another embodiment, a pedal assembly is provided. The pedal assembly includes a housing, a pedal arm, a plurality of elongated members, a plurality of strain gauge sensors, and a pair of circuit boards. The housing has a cavity. The pedal arm is at least partially received in the cavity. The pedal arm has a pedal pad on one end. The pedal arm is configured to move within the cavity relative to the housing. The plurality of elongated members are positioned within the cavity and configured to deflect upon a movement by the pedal arm caused from a load applied to the pedal pad. The plurality of strain gauge sensors are positioned in communication with a respective one of the plurality of elongated members and configured to sense an amount of the deflection of the respective elongated member of the plurality of elongated members. When the load is applied to the pedal pad, the pedal arm moves and deflects the at least one elongated member, which is sensed by the respective at least one strain gauge sensor indicative of an amount of load applied to the pedal pad. Two of the plurality of strain gauge sensors communicatively coupled to the one of the pair of circuit boards and the other of the plurality of strain gauge sensors communicatively coupled to the other one of the pair of circuit boards. Each of the plurality of strain gauge sensors communicatively coupled to a full bridge circuit and a microcontroller to convert an analog output signal from each of the plurality of strain gauge sensors into a digital signal. When the load is applied to the pedal pad, the pedal arm moves to deflect at least one of the plurality of elongated members which is sensed by the respective strain gauge sensor of the plurality of strain gauge sensors and transmits the analog output signal indicative of an amount of load applied to the pedal pad to the microcontroller through the full bridge circuit.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to a pedal assembly that includes a pedal arm movably positioned within a cavity of a housing. A proximal end of the pedal arm includes a pedal pad. Three elongated members are positioned within the cavity and each are configured to independently deflect upon a movement by a distal end of the pedal arm when a load is applied to the pedal pad. Each of the three elongated members includes a strain gauge sensor. Each of the three strain gauge sensors are configured to sense an amount of the deflection of the respective elongated member of the three elongated members. Two of the three strain gauge sensors are communicatively coupled to the one circuit board and the other strain gauge sensor is communicatively coupled to a different or separate circuit board defining a redundancy sensing assembly.

In a first aspect, each of the elongated members are suspended above an inner surface of the cavity via a pair of support beams. Each of the elongated members are configured to bend or deflect between the support members based on the amount of load applied to the pedal arm. As such, each of the elongated members are independently balanced and bend or deflect in response to a load applied to the pedal pad, which in turn is sensed by the respective strain gauge sensor indicative of the amount and pressure of the load applied to the pedal pad.

In a second aspect, a beam member is also positioned within the cavity and extends perpendicular to the pedal arm. The beam member incudes a void that receives the distal end of the pedal arm. A pair of bushings are spaced apart and positioned on each respective end of the beam member. A pair of guide pins are positioned at the respective pair of bushing and are coupled to the pedal pad extending such that the pedal arm extends between each of respective pair of guide pins. The elongated members are positioned to extend radially inward into the void such that the distal end of the pedal arm drives into or moves into the at least one of the elongated members when the load is applied to the pedal pad. Each of the elongated members includes a respective strain gauge sensor. When the load is applied to the pedal pad, the pedal arm causes the at least one of the three elongated members to independently deflect, which in turn is sensed by the respective strain gauge sensor indicative of the amount and pressure of the load applied to the pedal pad.

In a third aspect, each of the three elongated members are arranged in a vertical direction between the inner surface of the housing and an interior surface of the pedal pad. Each of the three strain gauges are arranged in the vertical direction between the inner surface of the housing and the interior surface of the pedal pad and between each of the three elongated members and sidewalls of the housing. When the load is applied to the pedal pad, the interior surface of the pedal pad drives into or moves into at least one of the three elongated members to compress the at least one of the three elongated members, which causes the at least one of the three elongated members to independently deflect, which in turn is sensed by the respective strain gauge sensor indicative of the amount and pressure of the load applied to the pedal pad.

Various embodiments of the pedal assembly are described in detail herein.

As used herein, the term "communicatively coupled" means that coupled components are capable of exchanging data signals with one another such as, for example, electrical signals via conductive medium or a non-conductive medium, though networks such as via Wi-Fi, Bluetooth, and the like, electromagnetic signals via air, optical signals via optical waveguides, and the like.

As used herein "minimal travel" or "reduced travel" or "limited travel" may be interchangeability used and refer to a pedal stroke of the pedal arm needed or required to detect the amount of load or force of the load applied to the pedal pad. In minimal travel pedal applications, the total travel of the pedal arm is 30 millimeters or less. As such, sensing the amount of travel of the pedal arm in these minimal travel applications for brake-by-wire applications must be precise due to the limited amount of pedal stroke. Load balancing of the pedal arm is desirable to detect a load applied to any portion of the pedal pad without the need for a direct center contact of the pedal pad. As such, the aspects of the pedal assemblies described herein are directed to minimal travel pedal assemblies with load balancing and strain gauge sensing that is more sensitive to the load applied to the pedal pad and is immune to load offset to sense any movement of the pedal arm regardless of where the load is applied to on the pedal pad.

Figures 1, 2:
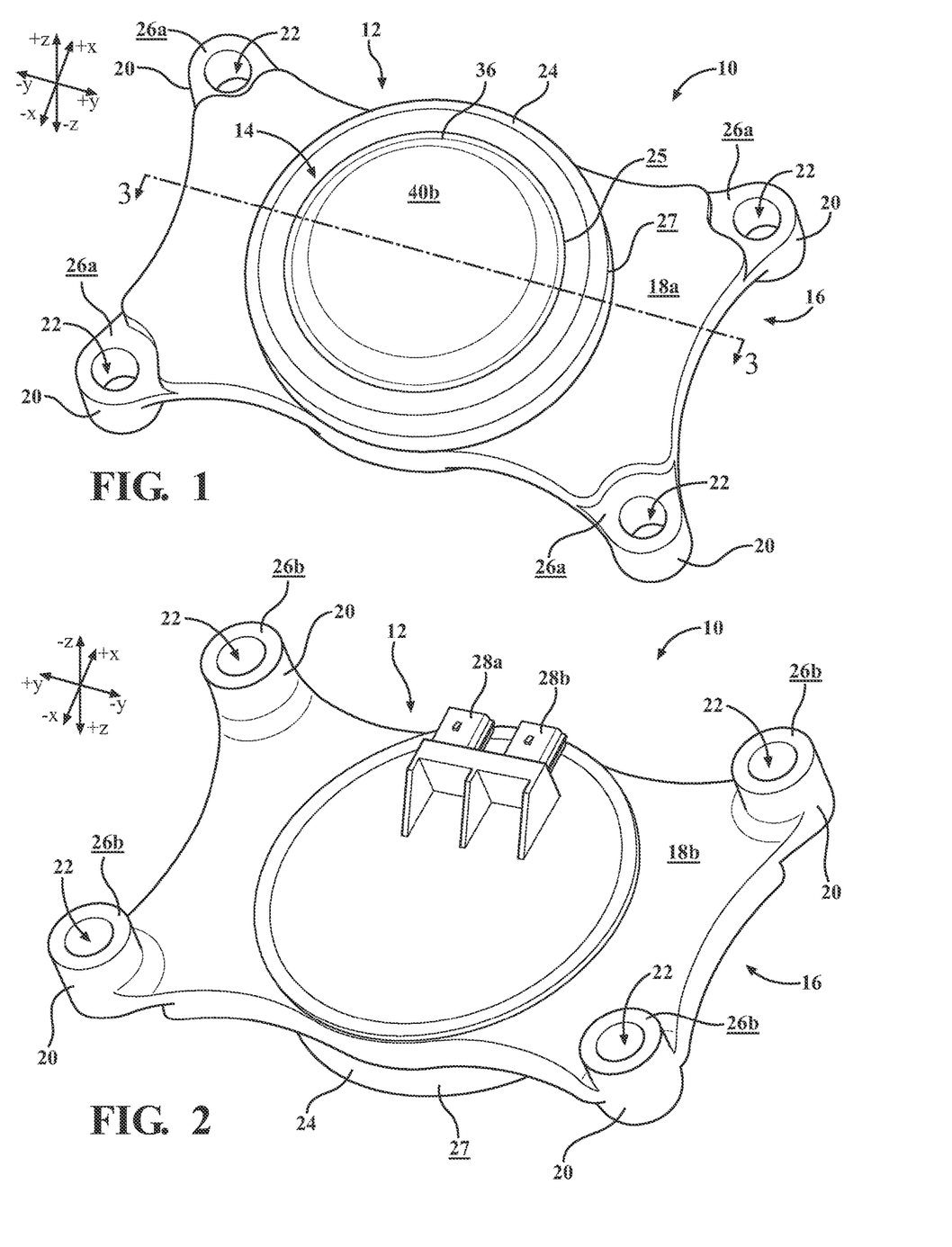
FIG. 1 schematically depicts a perspective top and side view of a pedal assembly according to one or more embodiments shown and described herein.
FIG. 2 schematically depicts a perspective bottom and side view of the pedal assembly of FIG. 1 according to one or more embodiments shown and described herein.

As used herein, the term "longitudinal direction" refers to the forward-rearward direction of the pedal assembly (i.e., in the +/−X-direction depicted in FIG. 1). The term "lateral direction" refers to the cross-pedal assembly direction (i.e., in the +/−Y-direction depicted in FIG. 1), and is transverse to the longitudinal direction. The term "vertical direction" or "up" or "above" or "below" refer to the upward-downward direction of the pedal assembly (i.e., in the +/−Z-direction depicted in FIG. 1).

Referring initially to FIGS. 1-2, a pedal assembly 10 is schematically depicted. The pedal assembly 10 includes a housing 12 and a pedal arm assembly 14. The housing 12 includes a base portion 16 that includes an exterior surface 18a and an opposite base surface 18b and a continuous wall portion 24 extending from the exterior surface 18a in the vertical direction (i.e., in the +/−Z direction). The continuous wall portion 24 includes an inner surface 25 and an opposite outer surface 27. A plurality of protrusions 20 extend from the base portion 16. As depicted, each the plurality of protrusions 20 includes a first terminating surface 26a, an opposite second terminating surface 26b and a bore 22 extending through the first terminating surface 26a and the second terminating surface 26b. Further, as depicted, each of the plurality of protrusions 20 are positioned at each of the corners of the base portion 16. This is non-limiting, the plurality of protrusions 20 may not all have bores or may not be positioned at each corner of the base portion 16.

Further, in some embodiments, the first terminating surface 26a of the plurality of protrusions 20 may be offset from the exterior surface 18a in the vertical direction (i.e., in the +/−Z direction) to be below the exterior surface 18a. As such, the second terminating surface 26b of the plurality of protrusions 20 may extend in a direction beyond the base surface 18b a greater distance that the amount of offset between the exterior surface 18a and the first terminating surface 26a in the vertical direction (i.e., in the +/−Z direction) to be below the exterior surface 18a. Each of the bores 22 of the plurality of protrusions 20 are configured to receive a fastener to couple the housing 12 to another component, such as a floor of a vehicle. Example fasteners include, without limitation, bolts and nuts, screws, rivets, and the like. That is, the housing 12 may be coupled or mounted to be positioned within, below, or extending from a floor surface of a vehicle.

A pair of connectors 28a, 28b extend from the base surface 18b. Each of the pair of connectors 28a, 28b are communicatively coupled to a pair of circuit boards 30a, 30b (FIG. 12) positioned within the housing 12, as discussed in greater detail herein. Each of the pair of connectors 28a, 28b are configured to communicatively couple the pedal assembly 10 to various other components of the vehicle, such as an electronic control unit, to continuous transmit and/or receive data between the electronic control unit on the vehicle side and the pedal assembly 10.

In some embodiments, the continuous wall portion 24 extends from the exterior surface 18a and the base portion 16 includes a recess 34 that together define a cavity 32 in the housing 12. In some embodiments, the continuous wall portion 24 is cylindrical shaped. As such, in these embodiments, at least a portion of the cavity 32 is also cylindrical shaped. In other embodiments, the continuous wall portion 24 and the cavity 32 may be other shapes, such as rectangular, square, octagonal, hexagonal, and the like.

A pedal pad 36 is positioned within the continuous wall portion 24 and extends at least partially into the cavity 32 of the housing 12. As depicted, the pedal pad 36 may be a similar shaped to the continuous wall portion 24. As such, in the depicted embodiment, the pedal pad 36 is cylindrical shaped. This is non-limiting and the pedal pad 36 may be other shapes, such as rectangular, square, octagonal, hexagonal, and the like. Further, as discussed in greater detail herein, the cavity 32 accommodates the pedal arm assembly 14 at a full depression to allow the pedal pad 36 to fully travel. That is, portions of the pedal arm assembly 14 including portions of the pedal pad 36 may be at least partially positioned to be within the cavity 32, as discussed in greater detail herein.

In some embodiments, the housing 12 including the base portion 16, the plurality of protrusions 20 and the continuous wall portion 24 are formed integrally as a single monolithic structure using known methods, such as injection molding, three-dimensional printing, and the like. In other embodiments, the base portion 16, the plurality of protrusions 20 and the continuous wall portion 24 may be assembled or coupled using fasteners such as weld, epoxy, adhesive, rivets, screws, bolts and nuts, and the like.

The housing 12 may be formed from a plastic material. For example, the housing 12 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, combinations thereof, and/or the like. Additionally, additives may be added such as UV absorbers, flame-retardants, colorants, glass fibers, plasticizers and/or the like.

Figure 3:
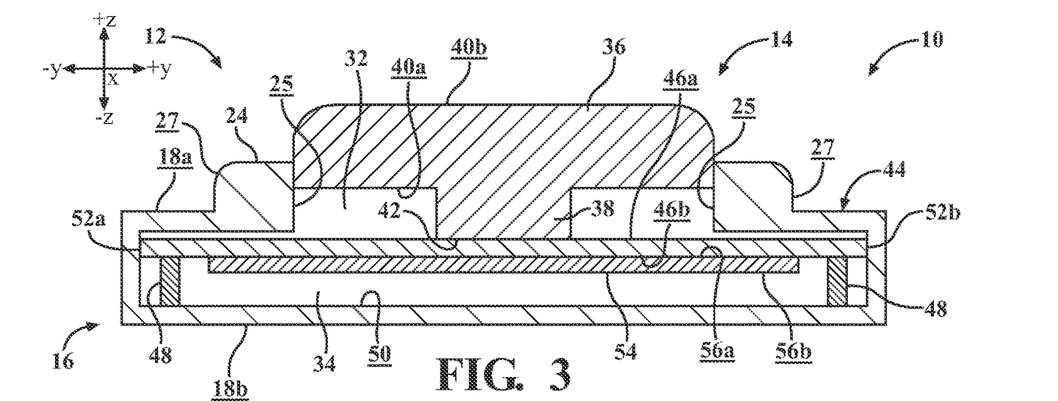
FIG. 3 schematically depicts a cross-sectional view of the pedal assembly of FIG. 1 taken from line 3-3 illustrating a first aspect of the pedal assembly of FIG. 1 in a home position according to one or more embodiments shown and described herein.
Figure 4:
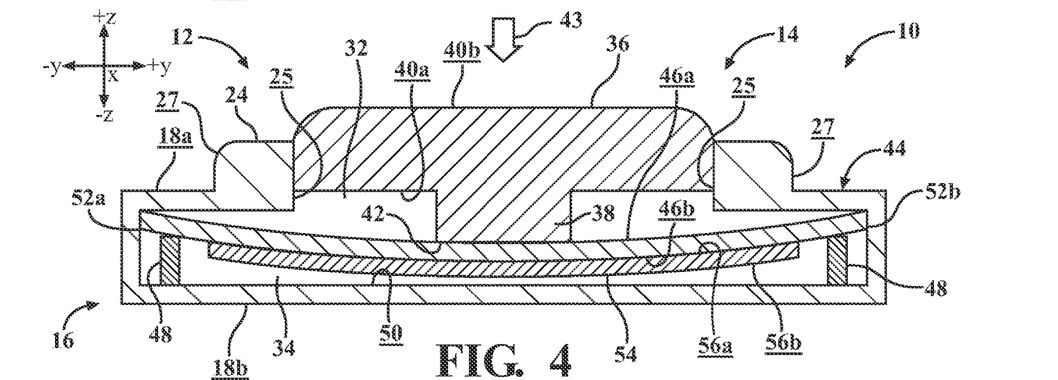
FIG. 4 schematically depicts the cross-sectional view of the pedal assembly of FIG. 3 with the pedal assembly in a load applied position according to one or more embodiments shown and described herein.
Figure 5:
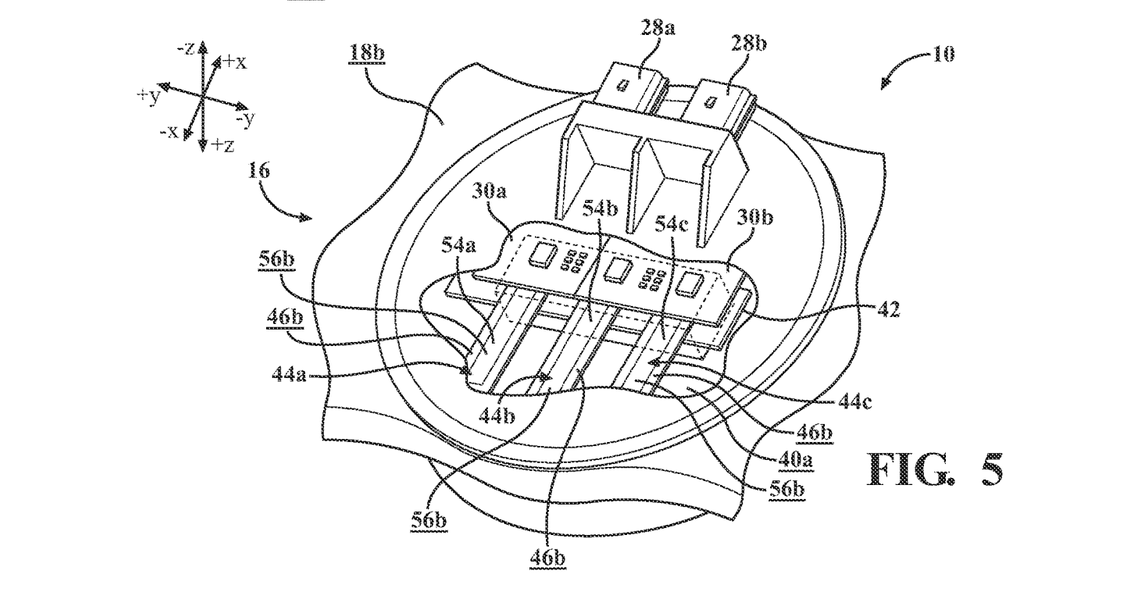
FIG. 5 schematically depicts a perspective cut out of the first aspect pedal assembly of FIG. 3 according to one or more embodiments shown and described herein.

Still referring to FIGS. 1-2 and now also referring to FIGS. 3-5, a first aspect of the example pedal assembly 10 is schematically depicted. In this aspect, the pedal arm assembly 14 includes a pedal arm 38 extending from an inner surface 40a of the pedal pad 36. An opposite outer surface 40b of the pedal pad 36 receives a load, illustrated by arrow 43, such as from a foot of a user. The pedal arm 38 extends from the inner surface 40a of the pedal pad 36 and terminates at a distal end 42. As such, portions of the pedal pad 36 and the pedal arm 38 are positioned within the cavity 32 of the housing 12. In some embodiments, the pedal arm 38 and the pedal pad are formed integrally as a single monolithic structure using known techniques such as injection molding, three-dimensional printing, and the like. The pedal pad 36 and the pedal arm 38 are configured to move in the vertical direction (i.e., in the +/−Z direction) within the cavity 32, as discussed in greater detail herein.

The first aspect of the example pedal assembly 10 further includes at least one elongated member 44 that includes a first surface 46a and an opposite second surface 46b. The first surface 46a is configured to abut the distal end 42 of the pedal arm 38. A pair of support members 48 extend within the recess 34 of the base portion 16 between an interior surface 50 of the base portion 16 and the second surface 46b of the at least one elongated member 44. Each of the pair of support members 48 are spaced apart and positioned near a respective end 52a, 52b of the at least one elongated member 44 to support the elongated member above the recess 34 in the vertical direction (i.e., in the +/−Z direction). As such, each of the support members 48 allow the at least one elongated member 44 to bend or deflect into the recess 34 when the load 43 is applied to the pedal pad 36, as discussed in greater detail herein.

That is, the at least one elongated member 44 is pliable and thus is configured to bend or deflect when the load 43 is applied to anywhere on the outer surface 40b of the pedal pad 36. As such, the at least one elongated member 44 balances the weight or load of the pedal arm 38 and the pedal pad 36 when there is not any load applied to the outer surface 40b of the pedal pad 36. When the load 43 is applied to the outer surface 40b of the pedal pad 36, the distal end 42 drives into the first surface 46a of the at least one elongated member 44 causing the at least one elongated member 44 to bend or deflect within the recess 34 between the pair of support members 48.

The at least one elongated member 44 may be formed from pliable materials such as aluminum, brass, copper, stainless steel, steel, elastic materials, shape memory materials, acrylic, veneer, silicone, and the like.

At least one strain gauge sensor 54 is coupled to or is otherwise attached to the second surface 46b of the at least one elongated member 44. The at least one strain gauge sensor 54 includes an attachment surface 56a and an opposite unattached surface 56b. The attachment surface 56a is coupled to attached to the second surface 46b of the at least one elongated member 44 while the unattached surface 56b extends in the direction of or into the recess 34 of the base portion 16 and is positioned to be spaced apart from the interior surface 50 of the base portion 16. The at least one strain gauge sensor 54 may be attached or coupled to the elongated member via fasteners. Example fasteners include, without limitation, epoxy, adhesive, weld, screws, rivets, bolts and nuts, and the like. The at least one strain gauge sensor 54 is communicatively coupled to one of the circuit boards 30a, 30b.

The at least one strain gauge 54 is configured to or capable of detecting the amount of displacement of the pedal am 38 by the amount of deflection or bending of the at least one elongated member 44. The at least one strain gauge sensor 54 is configured to or capable of outputting an electric signal or data corresponding to the amount of displacement of the pedal pad 36 by the sensing the amount of deflection or bending of the at least one elongated member 44 indicative of the amount of the load 43 applied to the pedal pad 36. As such, the at least one strain gauge sensor 54 is communicatively coupled to one of the circuit boards 30a, 30b and the components thereof to transmit the electric signal or data to the one of the circuit boards 30a, 30b and the components thereof, as discussed in greater detail herein.

In the depicted embodiment of FIG. 5, the at least one elongated member 44 is a plurality of elongated members, illustratively depicted as three elongated members 44a, 44b, 44c and the corresponding at least one strain gauge sensor 54 is a plurality of strain gauge sensors, illustratively depicted as three strain gauge sensors 54a, 54b, 54c. Each of the elongated members 44a, 44b, 44c and the corresponding strain gauge sensors 54a, 54b, 54c are spaced apart. Further, in some embodiments, the pair of support members 48 are positioned to support the three elongated members 44a, 44b, 44c and the corresponding strain gauge sensors 54a, 54b, 54c above the recess 34 in the vertical direction (i.e., in the +/−Z direction). In other embodiments, each of the elongated members 44a, 44b, 44c and corresponding strain gauge sensors 54a, 54b, 54c are supported by separate or independent support members. As such, each of the at least one elongated member 44 and the corresponding at least one strain gauge sensor 54 may be positioned within and enclosed by the housing 12.

As such, each of the elongated members 44a, 44b, 44c provide a load balancing to the pedal arm 38 and pedal pad 36. That is, each of the elongated members 44a, 44b, 44c are configured to independently balance the weight of the pedal pad 36 and pedal arm 38 and to bend or deflect in response to the load 43 applied to any portion of the outer surface 40b of the pedal pad 36, which in turn is sensed by the respective strain gauge sensors 54a, 54b, 54c indicative of the amount of the load 43 applied to the pedal pad 36. As such, the elongated members 44a, 44b, 44c and the corresponding strain gauge sensors 54a, 54b, 54c provide an improvement over conventional systems by providing a precise measurement to the load 43 applied to any portion of the pedal pad 36. That is, the user does not have to center contact with the pedal pad 36 and the load 43 may be applied to any portion of the pedal pad 36 and may vary in magnitude. Further, the arrangement of the elongated members 44a, 44b, 44c and strain gauge sensors 54a, 54b, 54c provide a precise sensing in applications where the pedal pad 36 and pedal arm 38 have a minimal travel.

Figure 12:
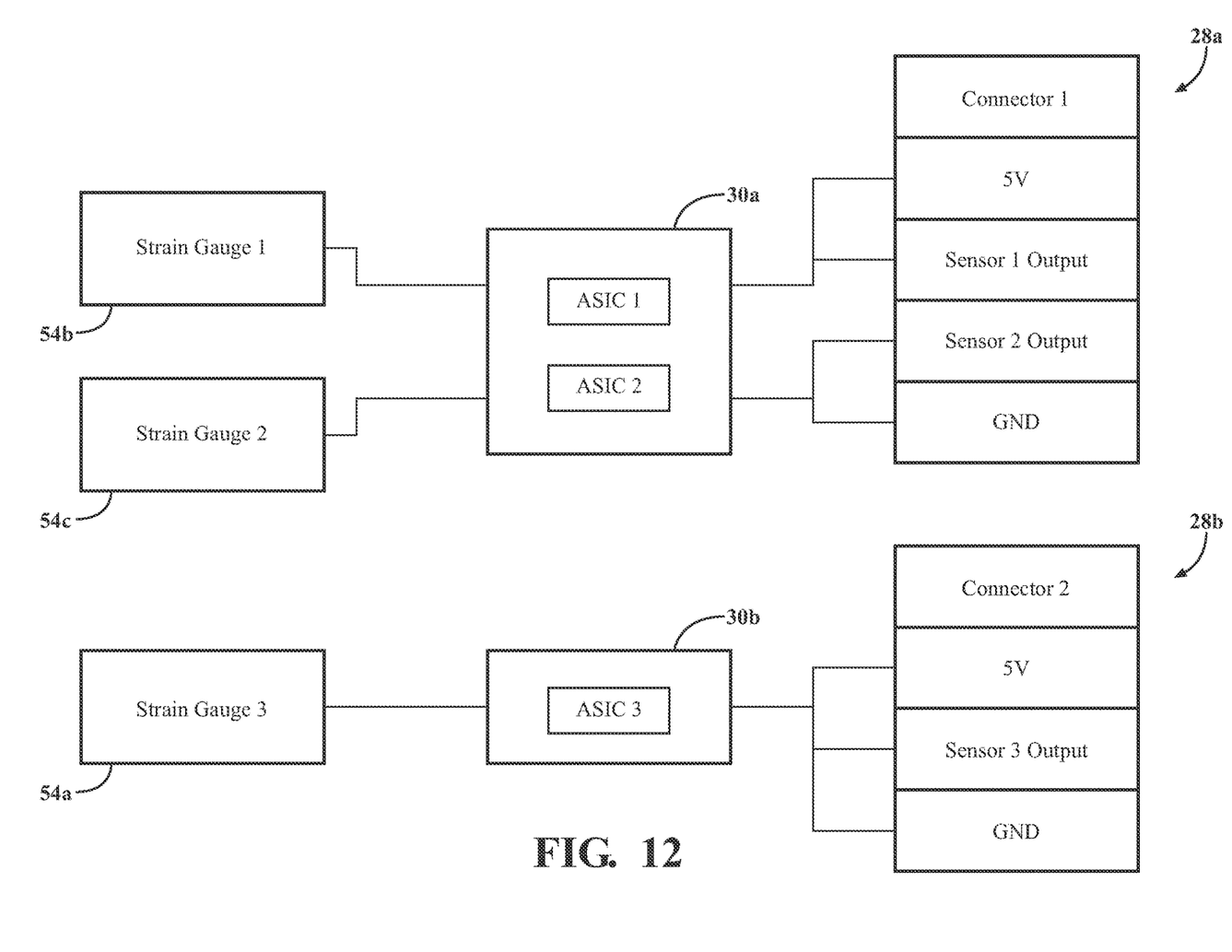
FIG. 12 schematically depicts a block diagram of the circuit board schematic of the pedal assembly of FIG. 1 according to one or more embodiments shown and described herein.

Further, each of the corresponding strain gauge sensors 54a, 54b, 54c provide a redundancy in sensing capabilities. As depicted in FIGS. 5 and 12, two of the strain gauge sensors 54b, 54c are communicatively coupled to the circuit board 30b while the strain gauge sensor 54a is communicatively coupled to the circuit board 30a. Such an arrangement permits for a redundancy in sensing the load 43 applied to anywhere on the outer surface 40b of the pedal pad 36 and provides a desirable fail-safe should any of the strain gauge sensors 54a, 54b, 54c and/or circuit boards 30a, 30b or components thereof fail.

Figure 6:
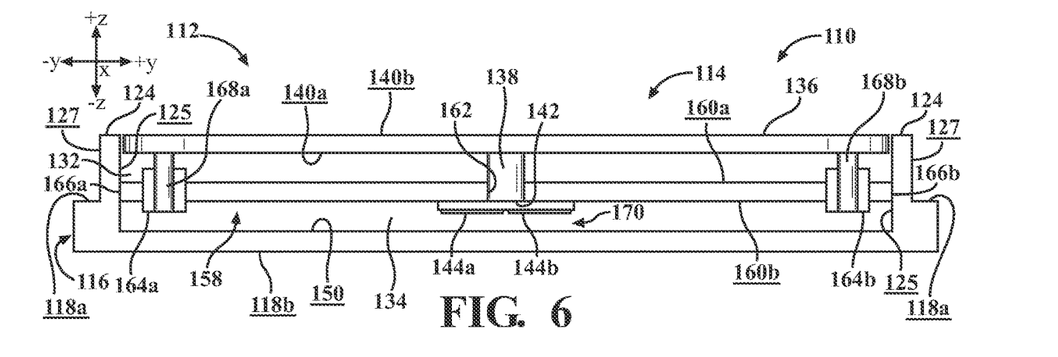
FIG. 6 schematically depicts a cross-sectional view of the pedal assembly of FIG. 1 taken from line 3-3 illustrating a second aspect of the pedal assembly of FIG. 1 in a home position according to one or more embodiments shown and described herein.
Figure 7:
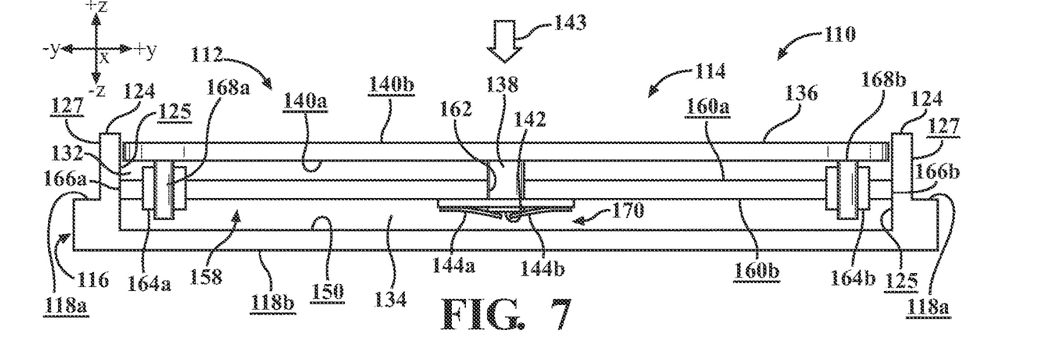
FIG. 7 schematically depicts the cross-sectional view of the pedal assembly of FIG. 6 with the pedal assembly in a load applied position according to one or more embodiments shown and described herein.
Figure 8:
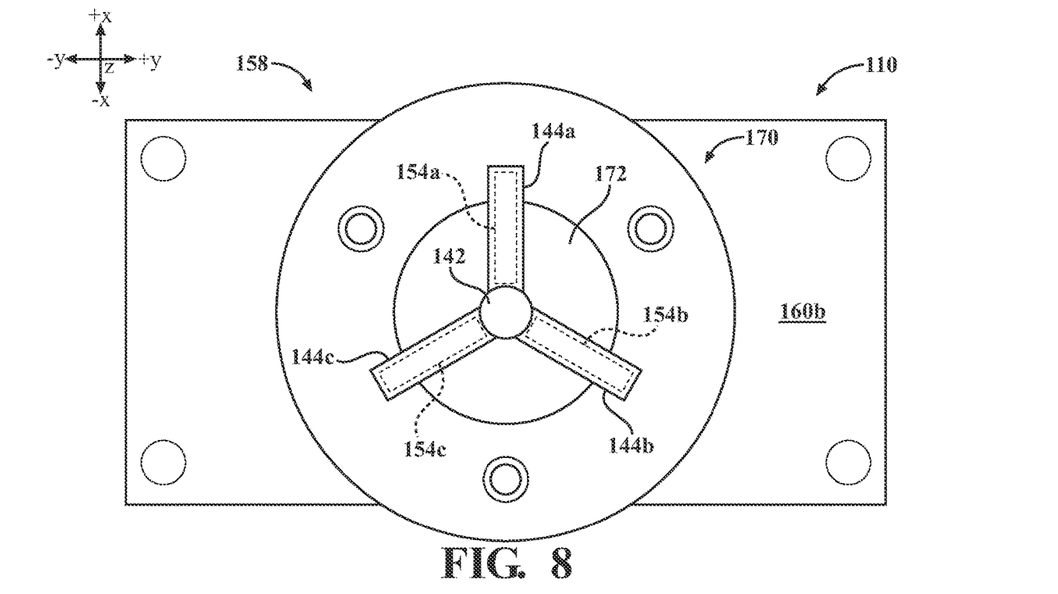
FIG. 8 schematically depicts a bottom view of the second aspect of the pedal assembly of FIG. 6 according to one or more embodiments shown and described herein.

Now referring to FIGS. 6-8, a second aspect of a pedal assembly 110 is schematically depicted. It is understood that the second aspect of the pedal assembly 110 is similar to the first aspect of the pedal assembly 10 with the exceptions of the features described herein. As such, like features will use the same reference numerals with a prefix "1" for the reference numbers. As such, for brevity reasons, these features will not be described again.

In a second aspect, a beam member 158 is also positioned within the cavity 132 and extends perpendicular to the pedal arm 138. The beam member 158 includes a cavity surface 160a and a recess surface 160b and a pair of terminating ends 166a, 166b. The pair of terminating ends 166a, 166b may be coupled or attached to the inner surface 125 of the continuous wall portion 124 via a fastener such as adhesive, weld, epoxy, bolts and nuts, rivets, screws, and the like. The beam member 158 includes an aperture 162 that receives at least the distal end 142 of the pedal arm 138 when the load 143 is applied to the pedal pad 136. A pair of bushings 164a, 164b are spaced apart and positioned on each respective terminating end 166a, 166b of the beam member 158. A pair of guide pins 168a, 168b are positioned at the respective pair of bushings 164a, 164b and are fixedly coupled to the inner surface 140a of the pedal pad 136. Each of the pair of guide pins 168a, 168b may be fixedly coupled to the inner surface 140a of the pedal pad 136 via a fastener, such as adhesive, weld, epoxy, bolts and nuts, rivets, screws, and the like.

Each of the pair of guide pins 168a, 168b extend in the vertical direction (i.e., in the +/−Z direction) such that the pedal arm 138 extends between each of respective pair of guide pins 168a, 168b. A disc member 170 is coupled or attached to the recess surface 160b of the beam member 158 via fasteners such as adhesive, weld, epoxy, bolts and nuts, rivets, screws, and the like. The disc member 170 includes an opening 172 in which each of the elongated members 144a, 144b, 144c are positioned to extend radially inward into the opening 172. As such, in this arrangement, each of the elongated members 144a, 144b, 144c are positioned to extend into the opening 172 such that any force onto the elongated members 144a, 144b, 144c cause the elongated members 144a, 144b, 144c to deflect due to a lack of support in the opening 172. As such, when the distal end 142 of the pedal arm 138 drives into one of the at least one of the elongated members 144a, 144b, 144c when the load 143 is applied to the pedal pad 136, this deflection may be sensed by the corresponding strain gauge sensors 154a, 154b, 154c. That is, each of the elongated members 144a, 144b, 144c are have a strength or are rigid enough to provide the load balancing to the pedal arm 138 and pedal pad 136 without a load and are pliable to deflect or bend when a small load change is applied to the pedal pad 136 as found in minimal travel pedal assemblies.

Figure 9:
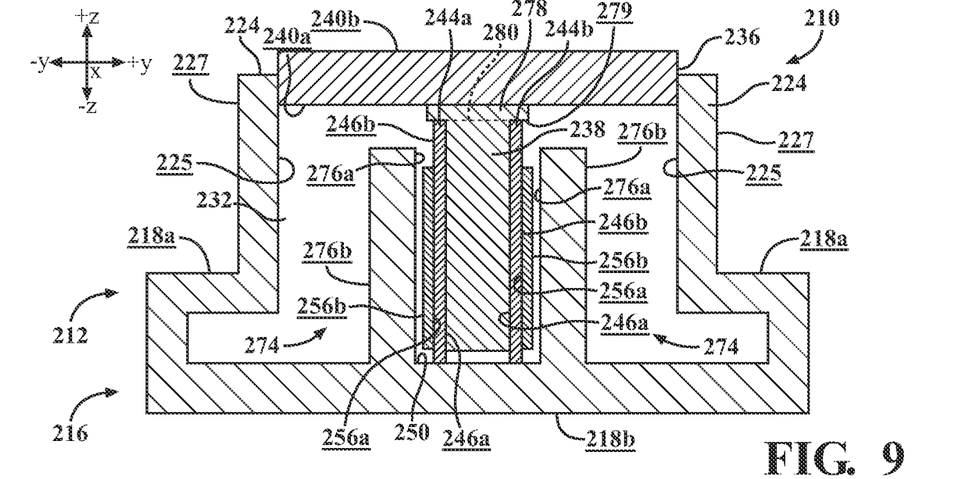
FIG. 9 schematically depicts a cross-sectional view of the pedal assembly of FIG. 1 taken from line 3-3 illustrating a third aspect of the pedal assembly of FIG. 1 in a home position according to one or more embodiments shown and described herein.
Figure 10:
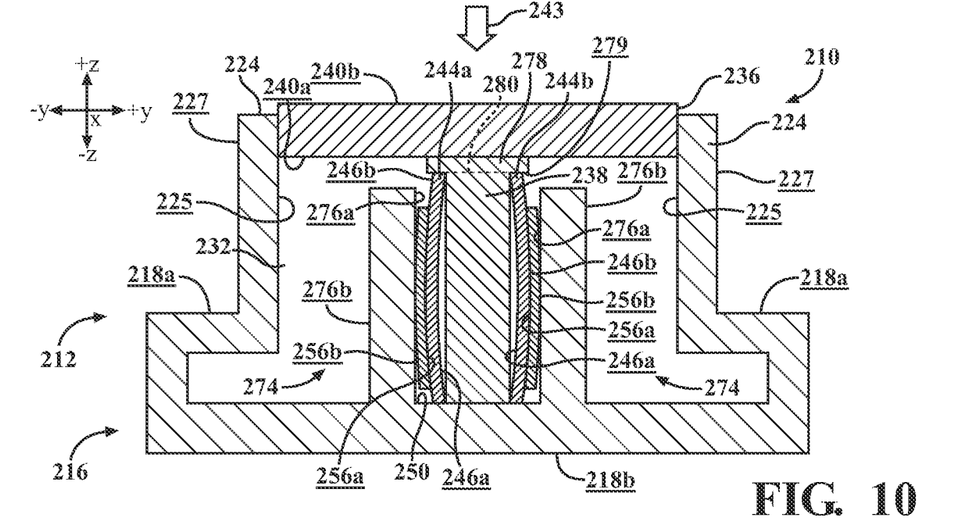
FIG. 10 schematically depicts the cross-sectional view of the pedal assembly of FIG. 9 with the pedal assembly in a load applied position according to one or more embodiments shown and described herein.
Figure 11:
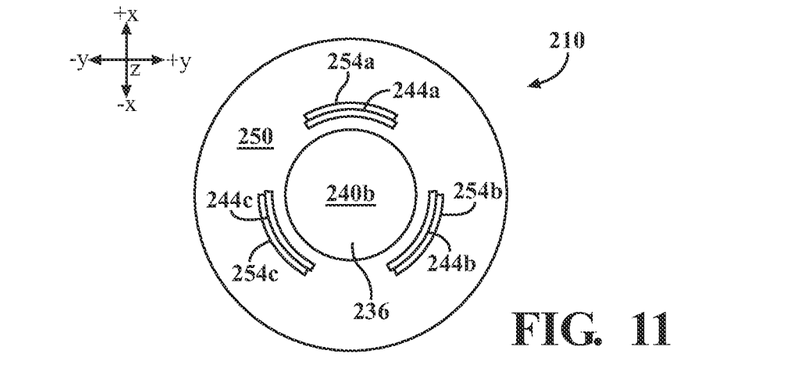
FIG. 11 schematically depicts a bottom view of the third aspect of the pedal assembly of FIG. 9 according to one or more embodiments shown and described herein.

Now referring to FIGS. 9-11, a third aspect of a pedal assembly 210 is schematically depicted. It is understood that the second aspect of the pedal assembly 210 is similar to the first aspect of the pedal assembly 10 with the exceptions of the features described herein. As such, like features will use the same reference numerals with a prefix "2" for the reference numbers. As such, for brevity reasons, these features will not be described again.

In the third aspect of the example pedal assembly 210, a pair of sidewalls 274 extend in the cavity 232 from the interior surface 250 of the housing 212 and extend between the inner surface 225 of the continuous sidewall portion 224 of the housing 212. Each of the pair of sidewalls 274 have an inner surface 276a and an opposite outer surface 276b. Each of the three elongated members 244a, 244b, 244c are arranged to extend in the vertical direction (i.e., in the +/−Z direction) between the interior surface 250 of the housing 212 and the inner surface 240a of the pedal pad 236. Each of the three strain gauges 254a, 254b, 254c are arranged in the vertical direction (i.e., in the +/−Z direction) between the interior surface 250 of the housing 212 and the inner surface 240a of the pedal pad 236 and between each of the three elongated members 244a, 244b, 244c and the inner surface 276a of the pair of sidewalls 274 and are spaced apart from the inner surface 276a of the pair of sidewalls 274.

In some embodiments, the pedal arm 238 further includes a flange member 278 positioned at the proximal end 280 of the pedal arm 238 to abut the inner surface 240a of the pedal pad 236. In this embodiment, the flange member 278 may be formed integrally with the proximal end 280 of the pedal arm 238 to be a monolithic structure. This non-limiting and the flange member 278 may be coupled to the proximal end 280 of the pedal arm 238 via fasteners such as weld, adhesive, epoxy, rivets, screws, bolts and nuts, and the like. When the load 243 is applied to the pedal pad 236, an inner surface 279 of the flange member 278 of the pedal arm 238 drives or moves into at least one of the three elongated members 244a, 244b, 244c to compress the at least one of the three elongated members 244a, 244b, 244c between the flange member 278 and the interior surface 250, which causes the at least one of the three elongated members 244a, 244b, 244c to independently deflect or bend outward, which in turn is sensed by the respective strain gauge sensor 254a, 254b, 254c indicative of the amount and/or magnitude of the load 243 applied to any portion of the outer surface 240b of the pedal pad 236.

In other embodiments, the inner surface 240a of the pedal pad 236 directly moves into or is driven into at least one of the three elongated members 244a, 244b, 244c to compress the at least one of the three elongated members 244a, 244b, 244c between the interior surface 250 of the base member 216 and the inner surface 240a of the pedal pad 236, which causes the at least one of the three elongated members 244a, 244b, 244c to independently deflect or bend outward, which in turn is sensed by the respective strain gauge sensor 254a, 254b, 254c indicative of the amount and/or magnitude of the load 243 applied to any portion of the outer surface 240b of the pedal pad 236.

Now referring to FIG. 12, a block diagram of the circuit board schematic of the pedal assembly 10 is schematically depicted. It should be understood that the block diagram depicted in FIG. 12 applies to the first aspect of the example pedal assembly 10, the second aspect of the example pedal assembly 110, and the third aspect of the example pedal assembly 210. As depicted, two of the strain gauge sensors 54b, 54c are communicatively coupled to the circuit board 30b while the strain gauge sensor 54a is communicatively coupled to the circuit board 30a. The circuit board 30b is communicatively coupled to the connector 28b while the circuit board 30a is communicatively coupled to the connector 28a. As such, data communication between the strain gauge sensors 54a, 54b, 54c to the electronic control unit on the vehicle side is established via the connectors 28a, 28b. Further, such an arrangement permits for a redundancy in sensing the load 43 applied to anywhere on the outer surface 40b of the pedal pad 36 and provides a desirable fail-safe should any of the strain gauge sensors 54a, 54b, 54c and/or circuit boards 30a, 30b or components thereof fail.

Figure 13:
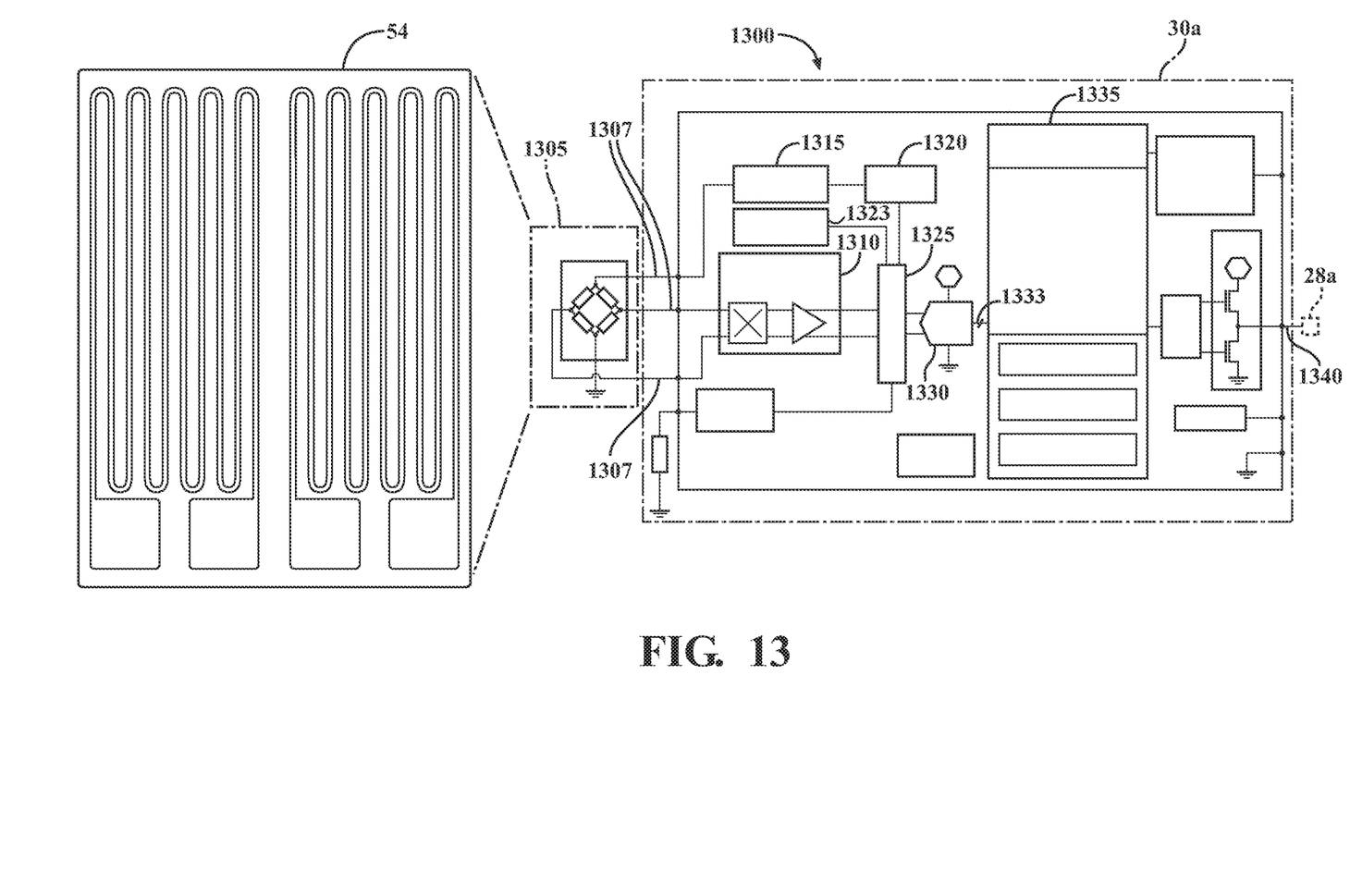
FIG. 13 schematically depicts a block diagram of a signal processing of one example strain gauge senor of the pedal assembly of FIG. 1 according to one or more embodiments shown and described herein.

Now referring to FIG. 13, an example application specific integrated circuit (ASIC), microcontroller, or signal processor 1300 of the data sensed by the at least one strain gauge sensor 54 of the example pedal assembly 10 is schematically depicted. It should be understood that the block diagram depicted in FIG. 13 applies to the first aspect of the example pedal assembly 10, the second aspect of the example pedal assembly 110, and the third aspect of the example pedal assembly 210. Further, while only one strain gauge sensor 54 is depicted, each strain gauge sensor 54 is communicatively coupled to an independent example ASIC, microcontroller, or signal processor 1300 as described herein, and for brevity reasons, only one example ASIC, microcontroller, or signal processor 1300 is described below.

As depicted, each strain gauge sensor of the at least one strain gauge sensor 54 may be coupled to or include a full bridge circuit 1305 such as a piezoresistive sensing element arranged as a full bridge circuit to output an analog signal 1307 indicative of the amount of deflection sensed in the respective elongated member 44. The full bridge circuit 1305 is communicatively coupled to a programmable-gain amplifier 1310 and to an analog supply voltage 1315 as a VDDA such that the analog signals from the strain gauge sensor 54 are transmitted to programmable-gain amplifier 1310 and to the analog supply voltage 1315, which is then output as a divided bridge current though a converter 1320 into a multiplexer 1325. The outputs from the programmable-gain amplifier 1310 is the second and third inputs into the multiplexer 1325, and data from a temperature sensor 1323 is the fourth input into the multiplexer 1325.

The multiplexer 1325 outputs or transmits signals into the an analog-to-digital converter 1330 and a digital signal 1333 is transmitted into the digital signal processor 1335, which outputs a processed digital signal 1340 to the connector 28a, for example, indicative of the current amount of deflection or bend applied to the at least one elongated member 44 of the first aspect of the example pedal assembly 10.

It should now be understood that the embodiments described herein are directed to a pedal assembly that includes pliable elongated members and strain gauge sensors to precisely sense any deflection or change in the elongated members as a result of a minimal movement of the pedal pad.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A pedal assembly comprising:
   a housing having a cavity;
   a pedal arm at least partially received in the cavity, the pedal arm having a pedal pad on one end, the pedal arm configured to move within the cavity relative to the housing;
   at least one elongated member positioned within the cavity and configured to deflect upon a movement by the pedal arm caused from a load applied to the pedal pad; and
   at least one strain gauge sensor attached to the at least one elongated member and configured to sense an amount of the deflection of the at least one elongated member;
   wherein when the load is applied to the pedal pad, the pedal arm moves and deflects the at least one elongated member, which is sensed by the respective at least one strain gauge sensor indicative of an amount of load applied to the pedal pad.

2. The pedal assembly of claim 1, wherein the housing is mounted to a floor.

3. The pedal assembly of claim 1, wherein:
   the at least one elongated member is three elongated members arranged to distribute the load applied to the pedal pad; and
   the at least one strain gauge sensor positioned in communication the at least one elongated member is three strain gauge sensors, each of the three elongated members includes one of the three strain gauge sensors.

4. The pedal assembly of claim 3, wherein each of the three elongated members are independently balanced above an interior surface of the housing in a vertical direction such that the three elongated members and the three strain gauge sensors are spaced apart from the interior surface of the housing.

5. The pedal assembly of claim 4, wherein when the load is applied to the pedal pad, the pedal arm causes at least one of the three elongated members to independently deflect into a recess positioned between the three strain gauge sensors and the interior surface of the housing.

6. The pedal assembly of claim 3, further comprising:
   a beam member positioned within the cavity and extending perpendicular to the pedal arm, the beam member having an aperture;
   a pair of bushings positioned on each end of the beam member;
   a pair of guide pins extending between the pedal pad and the beam member such that the pedal arm extends between each of the respective pair of guide pins;
   a disc member coupled to the beam member and having an opening coaxially aligned with the aperture, each of the three elongated members extending radially inward into the opening; and
   an other end of the pedal arm extending through the aperture to be in communication with each of the three elongated members.

7. The pedal assembly of claim 6, wherein when the load is applied to the pedal pad, the pedal arm causes the at least one of the three elongated members to independently deflect into the opening.

8. The pedal assembly of claim 3, further comprising:
   a flange member is positioned at a proximate end of the pedal arm;
   each of the three elongated members are arranged in a vertical direction between an interior surface of the housing and an inner surface of the flange member; and
   each of the three strain gauge sensors are arranged in the vertical direction and positioned between the interior surface of the housing and the inner surface of the flange member and between each of the three elongated members and sidewalls of the housing.

9. The pedal assembly of claim 8, wherein when the load is applied to the pedal pad, the flange member of the pedal arm moves such that the inner surface of the flange member compresses at least one of the three elongated members which causes at least one of the three elongated members to independently deflect.

10. A pedal assembly comprising:
    a housing having a cavity;
    a pedal arm at least partially received in the cavity, the pedal arm having a pedal pad on one end, the pedal arm configured to move within the cavity relative to the housing;
    three elongated members positioned within the cavity and each configured to independently deflect upon a movement by the pedal arm caused from a load applied to the pedal pad;
    three strain gauge sensors positioned in communication with a respective one of the three elongated members, each of the three strain gauge sensors configured to sense an amount of the deflection of the respective elongated member of the three elongated members; and
    a pair of circuit boards, two of the three strain gauge sensors communicatively coupled to the one of the pair of circuit boards and the other strain gauge sensor of the three strain gauge sensors communicatively coupled to the other one of the pair of circuit boards,
    wherein when the load is applied to the pedal pad, the pedal arm moves to deflect at least one of the three elongated members which is sensed by the respective strain gauge sensor indicative of the amount of an amount of load applied to the pedal pad.

11. The pedal assembly of claim 10, wherein each of the three elongated members are independently balanced above an interior surface of the housing in a vertical direction such that each of the three elongated members and the corresponding three strain gauges are spaced apart from the interior surface of the housing.

12. The pedal assembly of claim 11, wherein when the load is applied to the pedal pad, the movement of the pedal arm causes at least one of the three elongated members to independently deflect into a recess positioned between the three elongated members and the interior surface of the housing.

13. The pedal assembly of claim 10, further comprising:
    a beam member positioned within the cavity and extending perpendicular to the pedal arm, the beam member having an aperture;
    a pair of bushings positioned on each end of the beam member;

a pair of guide pins extending between the pedal pad and the beam member such that the pedal arm extends between each of the respective pair of guide pins;

a disc member coupled to the beam member and having an opening coaxially aligned with the aperture, each of the three elongated members extending radially inward into the opening; and an other end of the pedal arm extending through the aperture to be in communication with each of the three elongated members.

14. The pedal assembly of claim 13, wherein when the load is applied to the pedal pad, the movement of the pedal arm causes at least one of the three elongated members to independently deflect.

15. The pedal assembly of claim 10, further comprising:

a flange member is positioned at a proximate end of the pedal arm;

each of the three elongated members are arranged in a vertical direction between an interior surface of the housing and an inner surface of the flange member; and each of the three strain gauge sensors are arranged in the vertical direction and positioned between the interior surface of the housing and the inner surface of the flange member and between each of the three elongated members and sidewalls of the housing.

16. The pedal assembly of claim 15, wherein when the load is applied to the pedal pad, the flange member of the pedal arm moves such that the inner surface of the flange member compresses at least one of the three elongated members which causes at least one of the three elongated members to independently deflect.

17. A pedal assembly comprising:

a housing having a cavity;

a pedal arm at least partially received in the cavity, the pedal arm having a pedal pad on one end, the pedal arm configured to move within the cavity relative to the housing;

a plurality of elongated members positioned within the cavity and each configured to independently deflect upon a movement by the pedal arm caused from a load applied to the pedal pad;

a plurality of strain gauge sensors positioned in communication with a respective one of the plurality of elongated members, each of the plurality of strain gauge sensors configured to sense an amount of the deflection of the respective elongated member of the plurality of elongated members; and a pair of circuit boards, two of the plurality of strain gauge sensors communicatively coupled to one of the pair of circuit boards and the other plurality of strain gauge sensors communicatively coupled to the other one of the pair of circuit boards, each of the plurality of strain gauge sensors communicatively coupled to a full bridge circuit and a microcontroller to convert an analog output signal from each of the plurality of strain gauge sensors into a digital signal, wherein when the load is applied to the pedal pad, the pedal arm moves to deflect at least one of the plurality of elongated members which is sensed by the respective strain gauge sensor of the plurality of strain gauge sensors and transmits the analog output signal indicative of an amount of load applied to the pedal pad to the microcontroller through the full bridge circuit.

18. The pedal assembly of claim 17, wherein:

each of the plurality of elongated members are independently balanced above an interior surface of the housing in a vertical direction such that the plurality of elongated members and the corresponding plurality of strain gauge sensors are spaced apart from the interior surface of the housing; and when the load is applied to the pedal pad, the pedal arm moves to cause at least one of the plurality of elongated members to independently deflect into a recess between the plurality of elongated members and the interior surface of the housing.

19. The pedal assembly of claim 17, further comprising:

a beam member positioned within the cavity and extending perpendicular to the pedal arm, the beam member having an aperture;

a pair of bushings positioned on each end of the beam member;

a pair of guide pins extending between the pedal pad and the beam member such that the pedal arm extends between each of the respective pair of guide pins;

a disc member coupled to the beam member and having an opening coaxially aligned with the aperture, each of the plurality of elongated members extending radially inward into the opening; and an other end of the pedal arm extending through the aperture to be in communication with each of the plurality of elongated members, wherein when the load is applied to the pedal pad, the pedal arm causes at least one of the plurality of elongated members to independently deflect.

20. The pedal assembly of claim 17, further comprising:

a flange member is positioned at a proximate end of the pedal arm;

each of the plurality of elongated members are arranged in a vertical direction between an interior surface of the housing and an inner surface of the flange member; and each of the plurality of strain gauge sensors are arranged in the vertical direction and positioned between the interior surface of the housing and the inner surface of the flange member and between each of the plurality of elongated members and sidewalls of the housing, wherein when the load is applied to the pedal pad, the inner surface of the flange member moves to compress at least one of the plurality of elongated members which causes the at least one of the plurality of elongated members to independently deflect.

\* \* \* \* \*

UNITED STATES PATENT AND TRADEMARK OFFICE
CERTIFICATE OF CORRECTION

PATENT NO. : 11,953,932 B2
APPLICATION NO. : 18/107775
DATED : April 9, 2024
INVENTOR(S) : Rachel Luu and Lingmin Shao Page 1 of 2

It is certified that error appears in the above-identified patent and that said Letters Patent is hereby corrected as shown below:

In the Specification

In Column 1, Line(s) 26, before "target", delete "a", therefor.

In Column 2, Line(s) 10-11, after "amount", delete "of an amount", therefor.

In Column 4, Line(s) 10, delete "bushing" and insert --bushings--, therefor.

In Column 4, Line(s) 11, before "respective", insert --the--, therefor.

In Column 4, Line(s) 43, delete "though" and insert --through--, therefor.

In Column 4, Line(s) 47, delete "interchangeability" and insert --interchangeably--, therefor.

In Column 4, Line(s) 62, after "applied", delete "to", therefor.

In Column 5, Line(s) 15, after "each", insert --of--, therefor.

In Column 5, Line(s) 30, after "distance", delete "that" and insert --than--, therefor.

In Column 5, Line(s) 48, delete "continuous" and insert --continuously--, therefor.

In Column 5, Line(s) 63, delete "shaped" and insert --shape--, therefor.

In Column 7, Line(s) 15, after "coupled to", delete "attached to", therefor.

In Column 7, Line(s) 32, before "sensing", delete "the", therefor.

In Column 8, Line(s) 52, before "respective", insert --"the"--, therefor.

Signed and Sealed this
Second Day of September, 2025

Coke Morgan Stewart
*Acting Director of the United States Patent and Trademark Office*

CERTIFICATE OF CORRECTION (continued)
U.S. Pat. No. 11,953,932 B2

In Column 9, Line(s) 2, after "144c", delete "are", therefor.

In Column 9, Line(s) 38, before "non-limiting", insert --"is"--, therefor.

In Column 10, Line(s) 47, after "1310", delete "is" and insert --are--, therefor.

In Column 10, Line(s) 50, after "signals into", delete "the", therefor.

In the Claims

In Column 11, Line(s) 40-41, Claim 3, after "communication", insert --"with"--, therefor.

In Column 12, Line(s) 41, Claim 10, after "coupled to", delete "the", therefor.